(12) United States Patent
Chen et al.

(10) Patent No.: US 11,754,787 B2
(45) Date of Patent: Sep. 12, 2023

(54) MULTI-CHANNEL LIGHT-RECEIVING MODULE

(71) Applicant: Accelink Technologies Co., Ltd., Wuhan (CN)

(72) Inventors: Tuquan Chen, Wuhan (CN); Chenggang Liu, Wuhan (CN); Ruyu Shi, Wuhan (CN)

(73) Assignee: Accelink Technologies Co., Ltd.

( * ) Notice: Subject to any disclaimer, the term of this patent is extended or adjusted under 35 U.S.C. 154(b) by 0 days.

(21) Appl. No.: 17/639,084

(22) PCT Filed: Mar. 26, 2021

(86) PCT No.: PCT/CN2021/083431
§ 371 (c)(1),
(2) Date: Feb. 28, 2022

(87) PCT Pub. No.: WO2021/197240
PCT Pub. Date: Oct. 7, 2021

(65) Prior Publication Data
US 2022/0299708 A1    Sep. 22, 2022

(30) Foreign Application Priority Data

Mar. 31, 2020  (CN) .......................... 202010244053.3

(51) Int. Cl.
*G02B 6/293* (2006.01)
*G02B 6/42* (2006.01)

(52) U.S. Cl.
CPC ..... *G02B 6/29365* (2013.01); *G02B 6/29367* (2013.01); *G02B 6/4215* (2013.01)

(58) Field of Classification Search
None
See application file for complete search history.

(56) References Cited

U.S. PATENT DOCUMENTS 6,377,739 B1 * 4/2002 Richardson .............. G11B 7/14
 385/115
6,587,621 B2 * 7/2003 Weaver ................ G02B 6/4467
 385/39

(Continued)

FOREIGN PATENT DOCUMENTS

CN 203191577 U 9/2013
CN 103823281 A 5/2014

(Continued)

OTHER PUBLICATIONS

Chinese Search Report for Application No. 202010244053.3 dated Nov. 25, 2020, pp. 1-3.

(Continued)

*Primary Examiner* — Jerry Rahll
(74) *Attorney, Agent, or Firm* — Lerner David LLP

(57) ABSTRACT

Provided is a multi-channel light-receiving module, which comprises an incident collimator, a light-splitting assembly, an optical path conversion assembly and a photoelectric chip array which are arranged in sequence, wherein the light-splitting assembly comprises an inner reflector and a plurality of optical filters, and the optical filters are respectively arranged on an output end of the inner reflector; the channel interval of photoelectric chips in the photoelectric chip array is less than the channel interval of an adjacent optical filter; the optical path conversion assembly comprises a plurality of emergent collimators and an optical fiber connected to each of the emergent collimators; a plurality of paths of optical signals output by the light-splitting assembly are respectively coupled into corresponding optical fibers after passing through the plurality of emergent collimators; and the plurality of paths of optical signals are output by output ends of the plurality of optical fibers and are then coupled to the photoelectric chip array. By means of the light-receiving module, an optical path component is converted into a small (Continued)

channel interval of photoelectric chips from a large channel interval of optical filters, the problem of it being difficult to match the channel interval of optical filters and the channel interval of photoelectric chips is solved, the cost of photoelectric chips is reduced, and the assembly difficulty of optical filters is also reduced.

20 Claims, 3 Drawing Sheets

(56) References Cited

U.S. PATENT DOCUMENTS

| | | | |
|---|---|---|---|
| 7,038,191 B2 | 5/2006 | Kare et al. | |
| 7,457,492 B2* | 11/2008 | Umezawa | H04B 10/25 385/132 |
| 7,756,382 B2* | 7/2010 | Saravanos | G02B 6/2804 385/112 |
| 9,551,833 B1* | 1/2017 | Li | H04J 14/02 |
| 10,120,149 B1* | 11/2018 | Mathai | G02B 6/29365 |
| 10,182,275 B1* | 1/2019 | Xiao | G02B 6/29367 |
| 10,514,507 B1* | 12/2019 | Zhang | G02B 27/30 |
| 10,663,665 B2* | 5/2020 | Blazer | G02B 6/2551 |
| 2003/0099016 A1 | 5/2003 | Siljenberg et al. | |
| 2003/0103728 A1* | 6/2003 | Weaver | G02B 6/4467 385/100 |
| 2003/0152338 A1* | 8/2003 | Kuhara | G02B 6/42 398/164 |
| 2003/0152391 A1* | 8/2003 | Kuhara | G02B 6/4246 398/164 |
| 2004/0013366 A1* | 1/2004 | Morris, Jr. | G02B 6/29367 385/39 |
| 2004/0101247 A1* | 5/2004 | Chen | G02B 6/4292 385/47 |
| 2005/0031257 A1* | 2/2005 | Fouchel | G02B 6/12016 385/124 |
| 2007/0003205 A1* | 1/2007 | Saravanos | G02B 6/3636 385/137 |
| 2012/0189314 A1* | 7/2012 | Xu | G02B 6/4215 53/477 |
| 2015/0132003 A1* | 5/2015 | Greiner | G02B 6/4215 398/87 |
| 2017/0242195 A1* | 8/2017 | Lin | G02B 6/12007 |
| 2018/0128983 A1* | 5/2018 | Huang | H04J 14/0256 |
| 2019/0162904 A1* | 5/2019 | Blazer | G02B 6/4403 |
| 2022/0299708 A1* | 9/2022 | Chen | G02B 6/29365 |

FOREIGN PATENT DOCUMENTS

| | | |
|---|---|---|
| CN | 105334580 A | 2/2016 |
| CN | 108168843 A | 6/2018 |
| CN | 109683257 A | 4/2019 |
| CN | 208953742 U | 6/2019 |
| CN | 208999614 U | 6/2019 |
| CN | 111404609 A | 7/2020 |
| JP | 2017529552 A | 10/2017 |

OTHER PUBLICATIONS

International Search Report for Application No. PCT/CN2021/083431 dated Jun. 30, 2021, 2 pages.

* cited by examiner

MULTI-CHANNEL LIGHT-RECEIVING MODULE

CROSS-REFERENCE TO RELATED APPLICATIONS

The present application is a U.S. National entry under 35 U.S.C. § 371 of International Application No. PCT/CN2021/083431, filed Mar. 26, 2021, which claims the benefit of, and priority to, a Chinese patent application No. 202010244053.3, filed on Mar. 31, 2020, the disclosure of which is hereby expressly incorporated by reference herein in its entirety.

TECHNICAL FIELD OF THE DISCLOSURE

The present disclosure relates to the field of optical communication technology, and in particular to a multi-channel light-receiving module.

BACKGROUND

A light-transmitting module and a light-receiving module are the key components in an optical communication system. The rate of an optical transceiver module is increasing as the capacity of an optical communication system continues to increase. A transimpedance amplifier TIA, an optoelectronic chip, and a light-splitting assembly are the three main core parts of the light-receiving module. In order to facilitate batch packaging, the three core components generally use the same channel interval. Generally, the channel interval between the TIA and the optoelectronic chip is 750 μm, 500 μm, and 250 μm, etc. The smaller the channel interval between the TIA and the optoelectronic chip is, the smaller the area of the optoelectronic chip will be. Thus wafers with the same size can produce more optoelectronic chips, and their price will be correspondingly greatly lowered down. However, the channel interval between the optical filters of light-splitting assembly currently used in batches is generally 750 μm. As the channel interval of the splitting components becomes smaller, the size of the optical filter will be correspondingly reduced, and the requirement for the mounting accuracy will be higher accordingly, making it difficult to mass produce. The channel interval between the TIA and the optoelectronic chip may be reduced, but the channel interval between the optical filters of the light-splitting assembly is difficult to reduce, and the contradiction therebetween becomes an urgent problem to be solved.

SUMMARY

The purpose of embodiments of the present disclosure is to provide a multi-channel light-receiving module to solve the technical problem in the prior art that the large channel interval between the optical filters in the optical splitting assembly and the small channel interval between the optoelectronic chips are difficult to be matched.

In order to achieve the foregoing objective, the technical solutions of the embodiments of the present disclosure are implemented as follows.

An embodiment of the present disclosure provides a multi-channel light-receiving module, comprising an incident collimator, a light-splitting assembly, an optical path conversion assembly, and an optoelectronic chip array arranged in sequence, an external optical signal being converted into collimated light by the incident collimator and entering the light-splitting assembly, and the light-splitting assembly outputting a plurality of paths of optical signals which are respectively coupled to the optoelectronic chip array via the optical path conversion assembly and then being converted into electrical signals; the light-splitting assembly comprising an internal reflector and a plurality of optical filters which are respectively disposed at an output end of the internal reflector; a channel interval between optoelectronic chips in the optoelectronic chip array being smaller than a channel interval between adjacent optical filters; the optical path conversion assembly comprising a plurality of emergent collimators and optical fibers respectively connected to each of the emergent collimators, and the plurality of paths of optical signals output by the light-splitting assembly being respectively coupled to the corresponding optical fibers after passing through the plurality of emergent collimators, and being output by output ends of the plurality of optical fibers and then coupled to the optoelectronic chip array.

Further, an oblique reflecting surface is formed on one end of the optical fiber that is far away from the emergent collimator to couple the optical signal to the optoelectronic chip array.

Further, an intersection angle between the oblique reflecting surface and a direction of an optical path in the optical fiber is 45°.

Further, an end surface of the end of the optical fiber that is far away from the emergent collimator is perpendicular to the direction of the optical path in the optical fiber, and the optical path conversion assembly further comprises a first prism disposed on the end of the optical fiber that is far away from the emergent collimator; an optical signal enters the first prism from the output end of the optical fiber, and is reflected by the first prism and then is coupled to the optoelectronic chip array.

Further, the optical signal is reflected by the first prism and turned 90° and then enters the optoelectronic chip array.

Further, the optical path conversion assembly comprises a first substrate, and a plurality of grooves are formed on the first substrate and are respectively disposed corresponding to the optical fibers; and a plurality of the optical fibers are respectively disposed in the grooves, whereby the optical fibers are respectively disposed corresponding to the optoelectronic chip array.

Further, a number of the emergent collimator is equal to a number of the optical filter, and the emergent collimators are disposed corresponding to the optical filters.

Further, the multi-channel light-receiving module further comprises a second prism, which is disposed on a side of the light-splitting assembly that is far away from the optical filter to reflect collimated light output by the incident collimator to an incident area of the internal reflector.

Further, the multi-channel light-receiving module further comprises a tube housing, a second substrate, an optical port pin, a transimpedance amplifier array, and a flexible circuit board, the second substrate is disposed in the tube housing, both the light-splitting assembly and the optical path conversion assembly are disposed on the second substrate; one end of the optical port pin extends into the tube housing, and the other end is connected to an external optical path; both the optoelectronic chip array and the transimpedance amplifier array are disposed in the tube housing, the transimpedance amplifier array is electrically connected to the optoelectronic chip array; and the transimpedance amplifier array is connected to the flexible circuit board which outputs the electrical signals.

Further, the incident collimator is disposed in the optical port pin.

In the multi-channel light-receiving module provided by the embodiments of the present disclosure, the channel interval between adjacent optical filters of a light-splitting assembly is larger than the channel interval between adjacent optoelectronic chips in an optoelectronic chip array; a plurality of paths of optical signals output by the optical filters of the light-splitting assembly are received by a plurality of emergent collimators and coupled to optical fibers corresponding to the emergent collimators respectively, and then the plurality of channels optical signals are respectively output from the optical fibers and then coupled to the corresponding optoelectronic chips. The above-mentioned multi-channel light-receiving module utilizes an optical path conversion assembly composed of a plurality of emergent collimators and optical fibers disposed corresponding to the emergent collimators, to convert the optical path components from the large channel interval between the optical filters to the small channel interval between the optoelectronic chips, thereby solving the problem of the difficulty in matching the large channel interval between the optical filters of the light-splitting assembly with the small channel interval between the optoelectronic chips of the optoelectronic chip array, reducing not only the cost of the optoelectronic chip but also the difficulty of assembling the optical filters.

DETAILED DESCRIPTION

Figure 1:
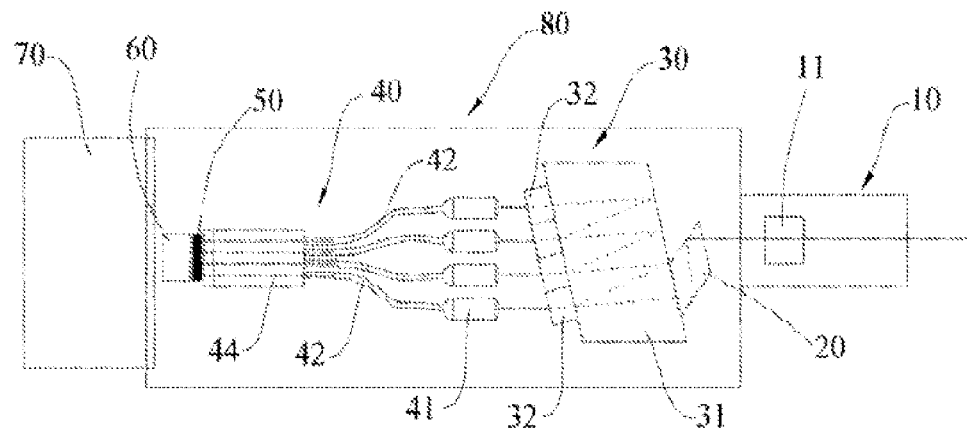
FIG. 1 is a schematic structural diagram of a multi-channel light-receiving module provided by an embodiment of the present disclosure.

The embodiments of the present disclosure are described in further detail below in conjunction with the drawings and specific embodiments. The terms of "first", "second", etc. in the embodiments of the present disclosure are only used for purpose of description, and cannot be understood as indicating or implying their relative importance or implicitly indicating the number or order of the indicated technical features. Therefore, the features defined with "first" and "second" may explicitly or implicitly include at least one of the features. In the description of the embodiments of the present disclosure, "a plurality of" means at least two, such as two, three, etc., unless otherwise specifically defined.

Referring to FIG. 1 to FIG. 5, an embodiment of the present disclosure provides a multi-channel light-receiving module, comprising an incident collimator 11, a light-splitting assembly 30, an optical path conversion assembly 40, and an optoelectronic chip array 50 which are arranged in sequence. An external signal is converted into collimated light by the incident collimator 11 and then enters the filter light-splitting assembly 30. The light-splitting assembly 30 outputs a plurality of paths of optical signals which are respectively coupled to the optoelectronic chip array 50 after passing through the optical path conversion assembly 40 and then are converted into electrical signals. The light-splitting assembly 30 comprises an internal reflector 31 and a plurality of optical filters 32, the optical filters 32 are respectively disposed at the output end of the internal reflector 31; the channel interval between the optoelectronic chips in the optoelectronic chip array 50 is smaller than that between adjacent filters 32.

In the embodiment of the present disclosure, referring to FIG. 1, the optical path conversion assembly 40 comprises a plurality of emergent collimators 41 and a plurality of optical fibers 42 connected to each of emergent collimators 41. The plurality of paths of optical signals output by the light-splitting assembly 30 are respectively coupled to the corresponding optical fibers 42 after passing through the plurality of emergent collimator 41, and the plurality of paths of optical signals are output by the output ends of the plurality of optical fibers 42 and then coupled to the optoelectronic chip array 50.

Understandably, referring to FIG. 1, the internal reflector 31 comprises two opposite end surfaces which are disposed in parallel. One of the two end surfaces is close to the incident collimator 11. The internal reflector 31 has an incident area and a reflection area. The incident area of the internal reflector 31 is coated with an antireflection coating for a target wavelength, and the reflection area is coated with a reflecting coating. The collimated light output by the incident collimator 11 is incident on the internal reflector 31 through the incident area of the internal reflector 31. The other end surface of the two end surfaces is located on an end of the internal reflector 31 that is far away from the incident collimator 11, and a plurality of optical filters 32 are disposed and arranged in sequence on the other end surface. The channel of each optical filter 32 allows the transmission of optical signals of its target wavelength and reflects optical signals of other wavelengths. The size of the channel interval between adjacent optical filters 32 determines a width of the optical filter 32, and the larger the width of the filters 32 is, the larger the clear aperture will be, and the lower the accuracy requirement for mounting the filter 32 will be. In an embodiment of the present disclosure, the channel interval between adjacent filters 32 is set to be 750 μm or 500 μm. Specifically, the number of filters 32 is four, and two adjacent filters 32 are adjacent to each other, so that the space on the end surface is fully utilized. The light-splitting assembly 30 divides the collimated light into a plurality of paths of optical signals for outputting according to their wavelengths.

Figure 2:
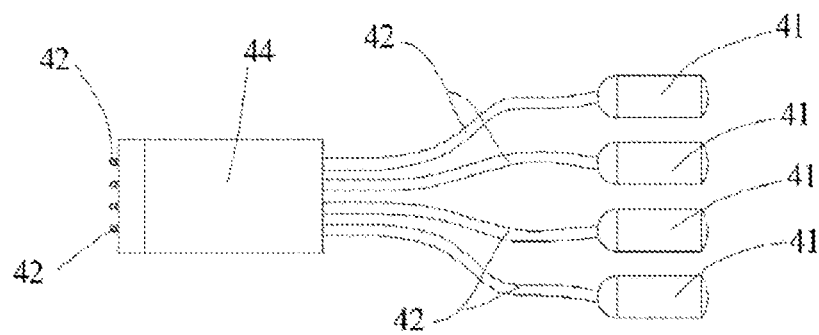
FIG. 2 is a schematic structural diagram of an optical path conversion assembly in an embodiment of the present disclosure.

In an embodiment of the present disclosure, referring to FIG. 2, the optical path conversion assembly 40 is provided with a plurality of emergent collimators 41 which are disposed corresponding to the optical filters 32 respectively to enable the plurality of paths of optical signals output by the optical filters 32 of the light-splitting assembly 30 to enter the corresponding emergent collimators 41 respectively. Further, the number of the emergent collimators 41 is equal to the number of the optical filters 32, and the emergent collimators 41 are disposed corresponding to the optical filters 32 respectively. It is understandable that the corresponding disposal of the emergent collimators 41 and the optical filters 32 can ensure that the plurality of paths of optical signals output by the output end of the light-splitting assembly 30 can be input to the emergent collimator 41, reducing optical signal loss. Specifically, the emergent collimator 41 may be a collimating lens. The optical path conversion assembly 40 is further provided with optical fibers 42 which are respectively connected to the emergent collimators 41, and the optical signals entering the emergent collimators 41 are respectively coupled to the corresponding optical fibers 42.

In an embodiment of the present disclosure, the channel interval between the optoelectronic chips in the optoelectronic chip array 50 is set to be smaller than the channel interval between the optical filters 32 in the light-splitting assembly 30. Specifically, the channel interval between adjacent optoelectronic chips is set to be 500 µm or 250 µm. The optical signal output from an end of the optical fiber 42 that is far away from the emergent collimator 41 can be coupled to a photosensitive area of the corresponding optoelectronic chip in the optoelectronic chip array 50, that is, the end of the optical fiber 42 that is far away from the emergent collimator 41 is disposed corresponding to the optoelectronic chip. The optical path interval between the plurality of paths of optical signals is reduced after the plurality of paths of optical signals pass through the optical path conversion assembly 40, so that it can be matched with the optoelectronic chip array 50.

In the multi-channel light-receiving module of the embodiments of the present disclosure, the channel interval between adjacent optical filters 32 of the light-splitting assembly 30 is larger than the channel interval between adjacent optoelectronic chips in the optoelectronic chip array 50; the plurality of emergent collimators 41 receive the plurality of paths optical signals output by the optical filters 32 of the light-splitter assembly 30 and then couple the plurality of paths optical signals to the optical fibers 42 disposed corresponding to the emergent collimators 41, then the plurality of paths of optical signals can be coupled into the optoelectronic chip disposed accordingly after being output by the optical fibers 42. The above-mentioned multi-channel light-receiving module utilizes the optical path conversion assembly 40 composed of the plurality of emergent collimators 41 and optical fibers 42 respectively disposed corresponding to the emergent collimators 41 to convert the optical path components from the large channel interval between the optical filters 32 to the small channel interval between the photoelectric chips, thereby solving the problem that the large channel interval between the optical filters 32 of the light-splitting assembly 30 and the small channel interval between the optoelectronic chips of the optoelectronic chip array 50 are difficult to match. This reduces not only the cost of the optoelectronic chip but also the difficulty of assembling the filter 32.

In some embodiments, the end of the optical fiber 42 that is far away from the emergent collimator 41 is formed with an oblique reflecting surface to couple an optical signal to the optoelectronic chip array 50. By providing the signal output end of the optical fiber 42 as an oblique reflecting surface, it may be convenient that the optical signal emitted from the optical fiber 42 performs a optical-path coupling with the external optoelectronic chip array 50, such that the parameter information of the optical signal can be obtained more accurately. Specifically, the angle between the oblique reflecting surface and a direction of the optical path in the optical fiber 42 is 45°. All components in the multi-channel light-receiving module are disposed along the direction of the optical path, which facilitates the smooth flow of the optical path and the installation of the components. The angle of 45° between the oblique reflecting surface and the direction of the optical path enables the optical signal to enter the photosensitive area of the photoelectric chip array 50 after being reflected by the oblique reflecting surface and the optical path turns 90°, through which the parameter information of the optical signal can be obtained more accurately.

Figure 4:
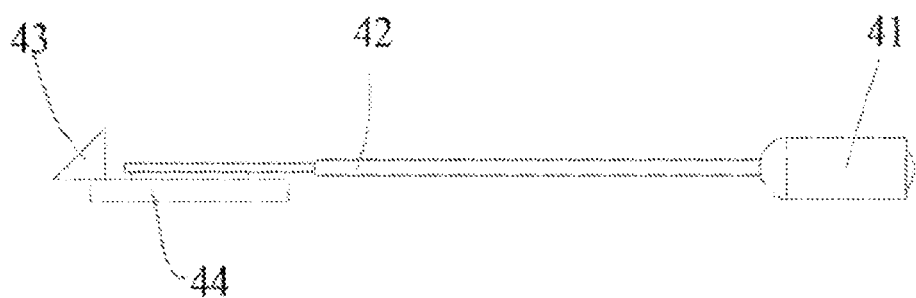
FIG. 4 is a cross-sectional view of an optical path conversion assembly in another embodiment.
Figure 5:
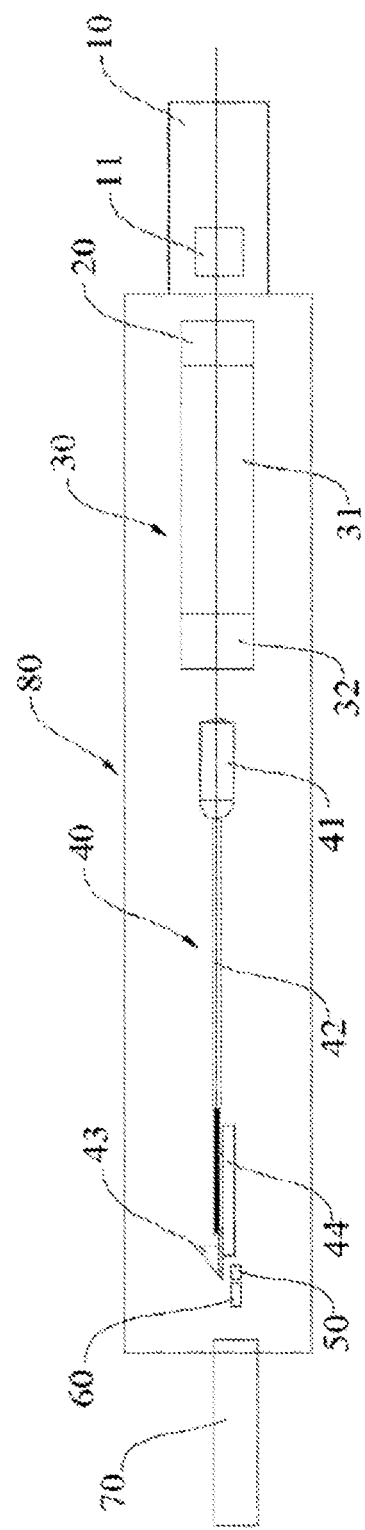
FIG. 5 is a cross-sectional view of a multi-channel light-receiving module in another embodiment.

In some embodiments, referring to FIG. 4 and FIG. 5, the end surface of the end of the optical fiber 42 that is far away from the emergent collimator 41 is perpendicular to the direction of the optical path in the optical fiber 42, and the optical path conversion assembly 40 further comprises a first prism 43 which is disposed at the end of the optical fiber 42 that is far away from the emergent collimator 41; the optical signal enters the first prism 43 from the output end of the optical fiber 42, and is reflected by the first prism 43 and then coupled to the optoelectronic chip array 50. In other words, the emergent surface of the signal output end of the optical fiber 42 is a non-oblique reflecting surface, rather than perpendicular to the direction of the optical path in the optical fiber 42, so that the optical signal at the output end of the optical fiber 42 will not be deflected. The first prism 43 is disposed at the signal output end of the optical fiber 42, and the optical signal is deflected by reflecting the optical signal using the first prism 43, thereby coupling with the external photoelectric chip array 50 in respect of optical path, which can obtain the parameter information of the optical signal more accurately. Specifically, the optical signal is reflected by the first prism 43 and then turned 90° to enter the optoelectronic chip array 50. The first prism 43 can be adhered on a first substrate 44 and located between the output end of the optical fiber 42 and the optoelectronic chip array 50. The first prism 43 is a right-angle turning prism, and its main cross-section is an isosceles right-angled triangle.

Figure 3:
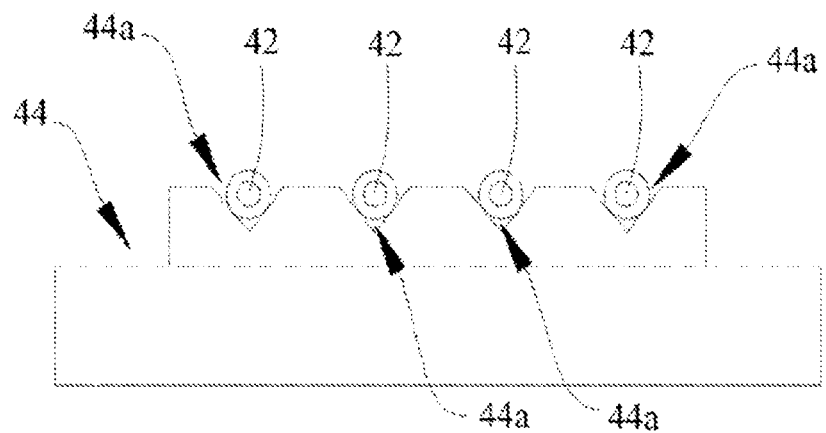
FIG. 3 is a cross-sectional view of match between optical fibers and a first substrate shown in FIG. 2.

In some embodiments, referring to FIG. 3, the optical path conversion assembly 40 comprises a first substrate 44, on which a plurality of grooves 44a are formed, and the grooves 44a are disposed respectively corresponding to the optical fibers 42; the plurality of optical fibers 42 are respectively disposed in the grooves 44a so that the optical fibers 42 are disposed corresponding to the optoelectronic chip array 50. That is to say, the plurality of optical fibers 42 are placed in the corresponding grooves 44a, and at this time, the optical fibers 42 can respectively correspond to the optoelectronic chips in the optoelectronic chip array 50. It is understandable that the plurality of grooves 44a of the first substrate 44 are used to respectively position the plurality of optical fibers 42 so as to more accurately couple the optical signal from the output end of the optical path conversion assembly 40 to the photosensitive area of the optoelectronic chip array 50. A center distance between the adjacent grooves 44a is the same as the channel interval between the optoelectronic chips in the optoelectronic chip array 50, so that it can ensure that the optical fibers 42 placed in the grooves 44a are accurately matched with the optoelectronic chips respectively, whereby the information regarding the optical signal parameters can be obtained more accurately. Specifically, the groove 44a may be configured as a V-shaped groove which is obtained by etching on the first substrate 44, and the optical fiber 42 are respectively fixed in the V-shaped grooves by means of adhesive.

In some embodiments, the multi-channel light-receiving module further comprises a second prism 20 which is disposed on one side of the light-splitting assembly 30 that is far away from the optical filters 32 in order to enable the collimated light output by the incident collimator 11 to be reflected to the incident area of the internal reflector 31. Understandably, the second prism 20 is disposed between the incident collimator 11 and the internal reflector 31, that is, the second prism 20 is located at an input end of the internal reflector 31, and it can change an incident direction of the optical signal on the internal reflector 31, such that the incident direction of the optical signal matches the incident channel of the internal reflector 31, and the optical signal loss is reduced. A spot diameter of the collimated light needs to be smaller than an effective clear aperture of the beam splitter 30.

In some embodiments, the multi-channel light-receiving module further comprises a tube housing 80, a second substrate, an optical port pin 10, a transimpedance amplifier array 60, and a flexible circuit board 70, wherein the second substrate is disposed in the tube housing 80, and the light-splitting assembly 30 and the optical path conversion assembly 40 are both disposed on the second substrate. One end of the optical port pin 10 extends into the tube housing 80, and the other end of the optical port pin 10 is connected to an external optical path. The optoelectronic chip array 50 and the transimpedance amplifier array 60 are both disposed in the tube housing 80, and the transimpedance amplifier array 60 is electrically connected to the optoelectronic chip array 50. The transimpedance amplifier array 60 is connected to the flexible circuit board 70, and the flexible circuit board 70 outputs electrical signals.

It can be understood that, in the embodiments of the present disclosure, the various components of the multi-channel light-receiving module are all disposed in the tube housing 80, and disposed, as shown in FIG. 1, according to the optical path structure, and the light-splitting assembly 30 and the optical path conversion assembly 40 are both disposed on the second substrate in the tube housing 80, which ensures that the transmission paths of the plurality of paths of optical signals in the module are more stable and reliable. The optical port pin 10 is located at the input end of the multi-channel light-receiving module, and is used for inputting an external optical signal and converting the optical signal into collimated light via the incident collimator 11. In an embodiment of the present disclosure, the incident collimator 11 is disposed in the optical port pin 10. The flexible circuit board 70 is located at the output end of the multi-channel light-receiving module, and is used to provide the light-receiving module with a DC power supply and output a light-receiving monitoring current and differential voltage signals. The tube housing 80 connects the input parts with the output parts. The transimpedance amplifier array 60 is used to convert the current signal output by the optoelectronic chip array 50 into a voltage signal, and output the electrical signal via the flexible circuit board 70. The transimpedance amplifier array 60 is disposed between the optoelectronic chip array 50 and the flexible circuit board 70 and is connected to the optoelectronic chip array 50 and the flexible circuit board 70 respectively.

In the embodiments of the present disclosure, the assembling sequence of the multi-channel light-receiving module is to, first mount the transimpedance amplifier array 60 and the optoelectronic chip array 50 at corresponding positions in the tube housing 80, and in order to reduce the cost, a small channel interval between the transimpedance amplifier and the optoelectronic chip is adopted, and is specifically 500 μm or 250 μm.

The optical path conversion assembly 40 and the light-splitting assembly 30 are first assembled outside the tube housing 80 in the manner of active coupling. The coupling assembly method is as follows: a beam of collimated light of four wavelengths is incident on the incident end of the light-splitting assembly 30, and a large-area optical power meter is placed at the other end of the light-splitting assembly 30; adjusting the angle and position of the incident collimated light and the light-splitter assembly 30 to ensure that the optical signal difference loss between the four optical filters 32 of the light-splitting assembly 30 is less than 0.5 dB, where the difference loss value is calculated by subtracting the intensity of the incident light from the light intensity measured by the optical power meter; then, moving the optical path conversion assembly to the output end of the light-splitting assembly 30, that is, the output end of the optical filter 32, and moving the optical power meter below the optical fiber array; coupling the emergent collimators 41 with the corresponding filters 32 respectively, wherein the criterion for qualified coupling is that the difference loss between the incident optical power of each channel and the optical power emitted by the optical fiber 42 and measured by the optical power meter is less than 1 dB. After the coupling is completed, the light-splitting assembly 30 and the optical path conversion assembly 40 are respectively fixed to the second substrate by means of adhesive. Finally, the optical fiber array and the optoelectronic chip array 50 are coupled and fixed.

The above-mentioned active assembling solution has the following advantages: the emergent collimator 41 has a large receiving clear aperture, so the coupling assembly tolerance between the emergent collimator 41 and the filter 32 is large, and is thus suitable for mass production. In addition, the above-mentioned assembling solution only needs to use a six-dimensional adjustment frame and a conventional area power meter. Compared with the coupling solution using a beam quality analyzer, the equipment cost is greatly reduced.

The above are only specific implementations of the embodiments of the present disclosure, but the protection scope of the embodiments of the present disclosure is not limited thereto. Any changes or replacements that can be easily conceived of by a person skilled in the art within the technical scope disclosed in the embodiments of the present disclosure should be covered by the protection scope of the embodiments of the present disclosure. In addition, the technical solutions between the various implementations of the embodiments of the present disclosure can be combined with each other, but must be based on what can be achieved by a person of ordinary skill in the art. When the combination of technical solutions is contradictory or cannot be achieved, this technical solution relating to such a combination should be considered nonexistent, nor does it fall within the scope of protection claimed by the embodiments of this application. Therefore, the protection scope of the embodiments of the present disclosure should be subject to the protection scope of the claims.

What is claimed is:

1. A multi-channel light-receiving module, comprising an incident collimator, a light-splitting assembly, an optical path conversion assembly, and an optoelectronic chip array arranged in sequence, an external optical signal being converted into collimated light by the incident collimator and then entering the light-splitting assembly, and the light-splitting assembly outputting a plurality of paths of optical signals which are respectively coupled to the optoelectronic chip array via the optical path conversion assembly and then being converted into electrical signals;

the light-splitting assembly comprising an internal reflector and a plurality of optical filters which are respectively disposed at an output end of the internal reflector;

a channel interval between optoelectronic chips in the optoelectronic chip array being smaller than a channel interval between adjacent optical filters;

the optical path conversion assembly comprising a plurality of emergent collimators and optical fibers respectively connected to each of the emergent collimators, and the plurality of paths of optical signals output by the light-splitting assembly being respectively coupled to the corresponding optical fibers after passing through the plurality of emergent collimators, and being output by output ends of the optical fibers and then coupled to the optoelectronic chip array.

2. The multi-channel light-receiving module of claim 1, an oblique reflecting surface being formed on one end of the optical fiber that is far away from the emergent collimator to couple the optical signal to the optoelectronic chip array.

3. The multi-channel light-receiving module of claim 2, an intersection angle between the oblique reflecting surface and a direction of an optical path in the optical fiber being 45°.

4. The multi-channel light-receiving module of claim 3, the multi-channel light-receiving module further comprising a second prism which is disposed on a side of the light-splitting assembly that is far away from the optical filter, to reflect the collimated light output by the incident collimator to an incident area of the internal reflector.

5. The multi-channel light-receiving module of claim 3, the optical path conversion assembly comprising a first substrate, and a plurality of grooves being formed on the first substrate and being disposed corresponding to the optical fibers; and a plurality of the optical fibers being respectively disposed in the grooves, whereby the optical fibers are disposed corresponding to the optoelectronic chip array.

6. The multi-channel light-receiving module of claim 2, the optical path conversion assembly comprising a first substrate, and a plurality of grooves being formed on the first substrate and being disposed corresponding to the optical fibers; and a plurality of the optical fibers being respectively disposed in the grooves, whereby the optical fibers are disposed corresponding to the optoelectronic chip array.

7. The multi-channel light-receiving module of claim 2, the multi-channel light-receiving module further comprising a second prism which is disposed on a side of the light-splitting assembly that is far away from the optical filter, to reflect the collimated light output by the incident collimator to an incident area of the internal reflector.

8. The multi-channel light-receiving module of claim 2, the multi-channel light-receiving module further comprising a tube housing, a second substrate, an optical port pin, a transimpedance amplifier array, and a flexible circuit board;
the second substrate being disposed in the tube housing, and both the light-splitting assembly and the optical path conversion assembly being disposed on the second substrate;
one end of the optical port pin extending into the tube housing, and the other end being connected to an external optical path;
the optoelectronic chip array and the transimpedance amplifier array both being disposed in the tube housing, and the transimpedance amplifier array being electrically connected to the optoelectronic chip array; and
the transimpedance amplifier array being connected to the flexible circuit board which outputs the electrical signals.

9. The multi-channel light-receiving module of claim 1, the multi-channel light-receiving module further comprising a tube housing, a second substrate, an optical port pin, a transimpedance amplifier array, and a flexible circuit board;
the second substrate being disposed in the tube housing, and both the light-splitting assembly and the optical path conversion assembly being disposed on the second substrate;
one end of the optical port pin extending into the tube housing, and the other end being connected to an external optical path;
the optoelectronic chip array and the transimpedance amplifier array both being disposed in the tube housing, and the transimpedance amplifier array being electrically connected to the optoelectronic chip array; and
the transimpedance amplifier array being connected to the flexible circuit board which outputs the electrical signals.

10. The multi-channel light-receiving module of claim 9, the incident collimator being disposed in the optical port pin.

11. The multi-channel light-receiving module of claim 1, an end surface of one end of the optical fiber that is far away from the emergent collimator being perpendicular to a direction of an optical path in the optical fiber, and the optical path conversion assembly further comprising a first prism disposed at the end of the optical fiber that is far away from the emergent collimator; and
the optical signal entering the first prism from the output end of the optical fiber and being coupled to the optoelectronic chip array after being reflected by the first prism.

12. The multi-channel light-receiving module of claim 11, the optical signal being reflected by the first prism and then turning 90° to enter the optoelectronic chip array.

13. The multi-channel light-receiving module of claim 12, the multi-channel light-receiving module further comprising a second prism which is disposed on a side of the light-splitting assembly that is far away from the optical filter, to reflect the collimated light output by the incident collimator to an incident area of the internal reflector.

14. The multi-channel light-receiving module of claim 12, the optical path conversion assembly comprising a first substrate, and a plurality of grooves being formed on the first substrate and being disposed corresponding to the optical fibers; and a plurality of the optical fibers being respectively disposed in the grooves, whereby the optical fibers are disposed corresponding to the optoelectronic chip array.

15. The multi-channel light-receiving module of claim 11, the optical path conversion assembly comprising a first substrate, and a plurality of grooves being formed on the first substrate and being disposed corresponding to the optical fibers; and a plurality of the optical fibers being respectively disposed in the grooves, whereby the optical fibers are disposed corresponding to the optoelectronic chip array.

16. The multi-channel light-receiving module of claim 11, the multi-channel light-receiving module further comprising a second prism which is disposed on a side of the light-splitting assembly that is far away from the optical filter, to reflect the collimated light output by the incident collimator to an incident area of the internal reflector.

17. The multi-channel light-receiving module of claim 11, the multi-channel light-receiving module further comprising a tube housing, a second substrate, an optical port pin, a transimpedance amplifier array, and a flexible circuit board;
the second substrate being disposed in the tube housing, and both the light-splitting assembly and the optical path conversion assembly being disposed on the second substrate;
one end of the optical port pin extending into the tube housing, and the other end being connected to an external optical path;

the optoelectronic chip array and the transimpedance amplifier array both being disposed in the tube housing, and the transimpedance amplifier array being electrically connected to the optoelectronic chip array; and the transimpedance amplifier array being connected to the flexible circuit board which outputs the electrical signals.

18. The multi-channel light-receiving module of claim 1, the optical path conversion assembly comprising a first substrate, and a plurality of grooves being formed on the first substrate and being disposed corresponding to the optical fibers; and a plurality of the optical fibers being respectively disposed in the grooves, whereby the optical fibers are disposed corresponding to the optoelectronic chip array.

19. The multi-channel light-receiving module of claim 1, a number of the emergent collimators being equal to a number of the filters, and the emergent collimators being disposed corresponding to the optical filters.

20. The multi-channel light-receiving module of claim 1, the multi-channel light-receiving module further comprising a second prism which is disposed on a side of the light-splitting assembly that is far away from the optical filter, to reflect the collimated light output by the incident collimator to an incident area of the internal reflector.

* * * * *